(12) United States Patent
Atai-Azimi

(10) Patent No.: US 6,845,427 B1
(45) Date of Patent: Jan. 18, 2005

(54) DISK DRIVE ALLOCATING CACHE SEGMENTS BY MAPPING BITS OF A COMMAND SIZE INTO CORRESPONDING SEGMENT POOLS

(75) Inventor: Alireza Atai-Azimi, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 259 days.

(21) Appl. No.: 10/280,747

(22) Filed: Oct. 25, 2002

(51) Int. Cl.[7] .............................................. G06F 12/00
(52) U.S. Cl. ........................ 711/113; 711/129; 711/173; 710/56; 710/52
(58) Field of Search .............................. 711/113, 129, 711/133, 170, 173, 171, 118; 710/52, 56

(56) References Cited

U.S. PATENT DOCUMENTS

| | | | |
|---|---|---|---|
| 5,890,211 A | 3/1999 | Sokolov et al. ............. | 711/113 |
| 5,966,726 A | 10/1999 | Sokolov ...................... | 711/113 |
| 6,336,164 B1 * | 1/2002 | Gerdt et al. ................. | 711/113 |
| 6,442,661 B1 * | 8/2002 | Dreszer ....................... | 711/170 |
| 6,470,423 B1 * | 10/2002 | Ho et al. ..................... | 711/129 |
| 6,473,830 B2 * | 10/2002 | Li et al. ...................... | 711/112 |
| 6,704,839 B2 * | 3/2004 | Butterworth et al. ........ | 711/114 |
| 6,711,635 B1 * | 3/2004 | Wang .......................... | 710/56 |

* cited by examiner

*Primary Examiner*—Brian R. Peugh
(74) *Attorney, Agent, or Firm*—Milad G. Shara, Esq.; Howard H. Sheerin, Esq.

(57) ABSTRACT

A disk drive is disclosed comprising a semiconductor memory comprising a cache buffer having a plurality of segment pools, each segment pool comprising a plurality of cache segments, and each cache segment comprises $2^k$ number of blocks where k is a predetermined integer for each segment pool. Host commands have a command size comprising a plurality of bits indicating a number of blocks of data associated with the host command. Each bit of the command size is mapped to a corresponding segment pool in order to allocate cache segments for the host commands.

10 Claims, 9 Drawing Sheets

| SEGMENT_LINK[SEGS] | |
|---|---|
| INDEX | VALUE |
| 0 | EOF |
| 1 | 2 |
| 2 | 3 |
| 3 | 4 |
| 4 | EOF |
| 5 | 0 |
| 6 | 7 |
| 7 | 8 |
| 8 | 9 |
| 9 | EOF |
| 10 | 11 |
| 11 | 12 |
| 12 | 13 |
| 13 | EOF |
| 14 | 15 |
| 15 | 16 |
| 16 | EOF |
| 17 | 19 |
| 18 | 5 |
| 19 | 20 |
| 20 | EOF |

HEAD$_1$, HEAD$_8$, HEAD$_{16}$, HEAD$_{64}$

FIG. 7A

| FREE_SEG_LIST[NUM_SIZES] | | |
|---|---|---|
| INDEX | HEAD | COUNT |
| 0 | 1 | 4 |
| 1 | 0 | 0 |
| 2 | 0 | 0 |
| 3 | 6 | 4 |
| 4 | 10 | 4 |
| 5 | 0 | 0 |
| 6 | 17 | 3 |
| 7 | 0 | 0 |

FIG. 7B

DISK DRIVE ALLOCATING CACHE SEGMENTS BY MAPPING BITS OF A COMMAND SIZE INTO CORRESPONDING SEGMENT POOLS

BACKGROUND OF THE INVENTION

1. Field of the Invention

The present invention relates to disk drives for computer systems. More particularly, the present invention relates to a disk drive allocating cache segments by mapping bits of a command size into corresponding segment pools.

2. Description of the Prior Art

A disk drive typically comprises a cache memory for caching data written to the disk as well as data read from the disk. The overall performance of the disk drive is affected by how efficiently the cache memory can be allocated for a host command. In the past, the cache memory has been divided into cache segments each comprising a number of blocks (e.g., eight blocks), wherein the cache system would allocate a number of cache segments to process the host command. This technique is inefficient, however, if the number of blocks in a cache segment does not integer divide into the number of blocks associated with processing the host command leaving part of a cache segment allocated but unused.

SUMMARY OF THE INVENTION

The present invention may be regarded as a disk drive comprising a disk having a plurality of tracks, each track comprising a plurality of blocks, wherein a head is actuated radially over the disk. The disk drive further comprises a semiconductor memory comprising a cache buffer for caching data written to the disk and data read from the disk, the cache buffer comprising a plurality of segment pools, each segment pool comprising a plurality of cache segments, and each cache segment comprises $2^k$ number of blocks where k is a predetermined integer for each segment pool. A host command is received from a host computer comprising a command size having a plurality of bits indicating a number of blocks of data associated with the host command. Each bit of the command size is mapped to a corresponding segment pool in order to allocate cache segments for the host command.

In one embodiment, a cache segment is allocated from a corresponding segment pool for each "1" bit in the command size. In another embodiment, a plurality of the bits of the command size are mapped to one of the segment pools.

In one embodiment, a plurality of cache segments of a first one of the segment pools are converted into a cache segment for a second one of the segment pools. In another embodiment, one of the cache segments of a first one of the segment pools is converted into a plurality of cache segments for a second one of the segment pools.

The present invention may also be regarded as a method of processing host commands in a disk drive. The disk drive comprises a disk having a plurality of tracks, wherein each track comprises a plurality of blocks. A head is actuated radially over the disk, and a semiconductor memory comprising a cache buffer caches data written to the disk and data read from the disk. The cache buffer comprises a plurality of segment pools, wherein each segment pool comprises $2^k$ number of blocks where k is a predetermined integer for each segment pool. A host command is received from a host computer, wherein the host command comprises a command size comprising a plurality of bits indicating a number of blocks of data associated with the host command. Each bit of the command size is mapped into a corresponding segment pool in order to allocate cache segments for the host command.

DESCRIPTION OF THE PREFERRED EMBODIMENTS

Figure 1A:
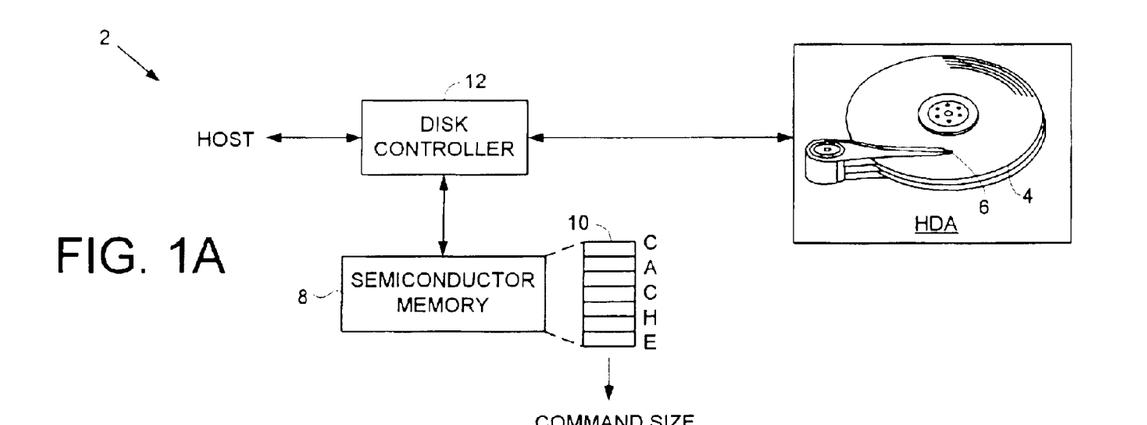
FIG. 1A shows a disk drive according to an embodiment of the present invention comprising a disk, a head actuated radially over the disk, a disk controller, and a semiconductor memory comprising a cache buffer for storing data in a plurality of segment pools of sizes $2^k$.

FIG. 1A shows a disk drive 2 according to an embodiment of the present invention comprising a disk 4 having a plurality of tracks, each track comprising a plurality of blocks, wherein a head 6 is actuated radially over the disk 4. The disk drive 2 further comprises a semiconductor memory 8 comprising a cache buffer 10 for caching data written to the disk 4 and data read from the disk 4, the cache buffer 10 comprising a plurality of segment pools, each segment pool comprising a plurality of cache segments, and each cache segment comprises $2^k$ number of blocks where k is a predetermined integer for each segment pool. A disk controller 12 receives a host command from a host computer comprising a command size having a plurality of bits indicating a number of blocks of data associated with the host command. The disk controller 12 maps each bit of the command size to a corresponding segment pool in order to allocate cache segments for the host command.

Figure 1B:
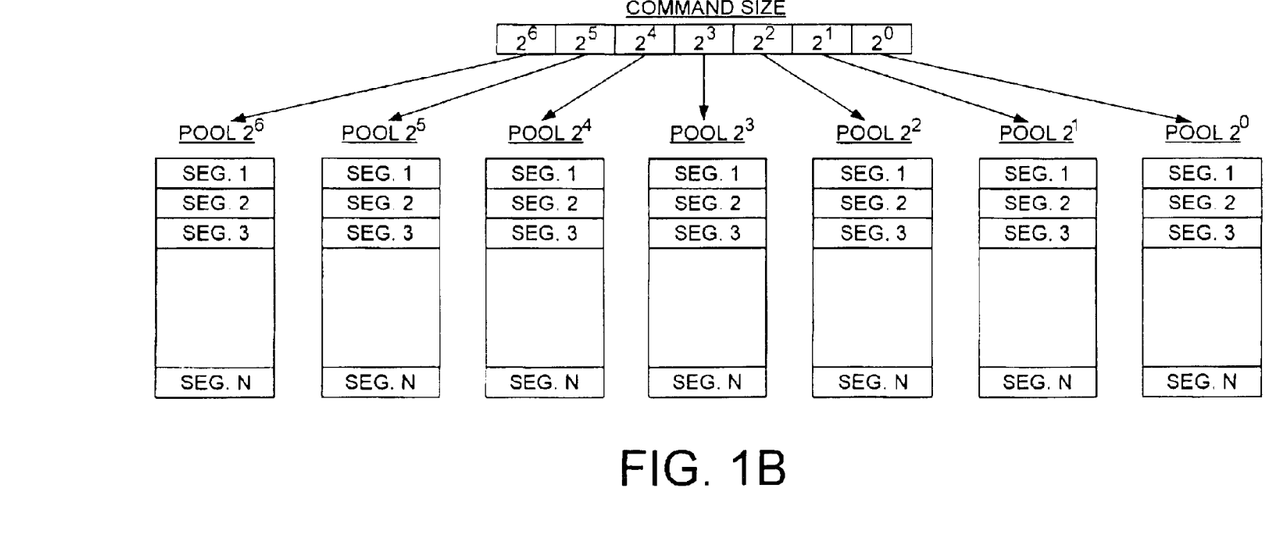
FIG. 1B shows an embodiment of the present invention wherein each bit of the command size is mapped to a respective segment pool.

In the embodiment of FIG. 1B, the command size comprises seven bits (k=0–6) where each bit is mapped to a corresponding segment pool comprising cache segments of $2^k$ number of blocks. For each "1" bit in the command size, the disk controller 12 allocates one of the cache segments from the corresponding segment pool. For example, if the command size in binary is 1101001 blocks, the disk controller 12 allocates a cache segment from the $2^0$ segment pool, a cache segment from the $2^3$ segment pool, a cache segment from the $2^5$ segment pool, and a cache segment from the $2^6$ segment pool. This direct one-to-one mapping of the bits in the command size to segment pools expedites and simplifies the cache allocation algorithm.

Figure 2A:
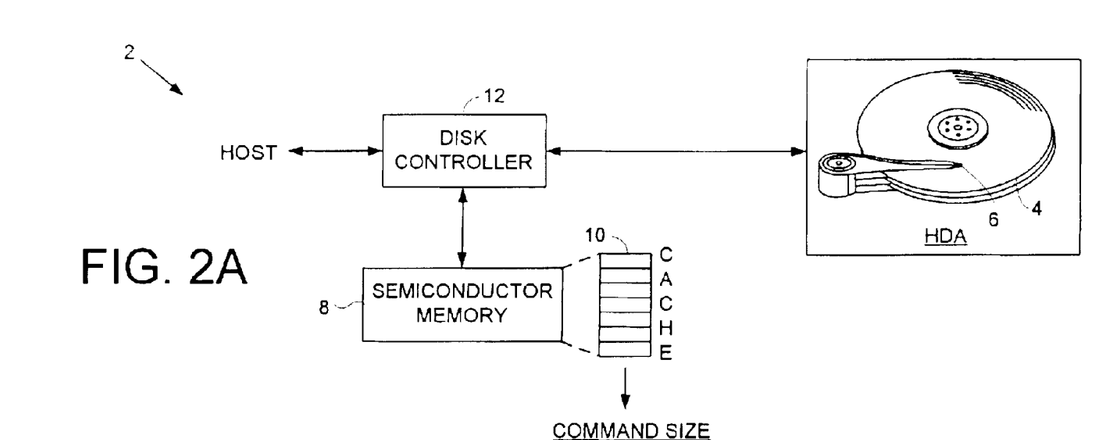
FIGS. 2A–2B show an embodiment of the present invention wherein a plurality of the bits of the command size are mapped to one of the segment pools.
Figure 2B:
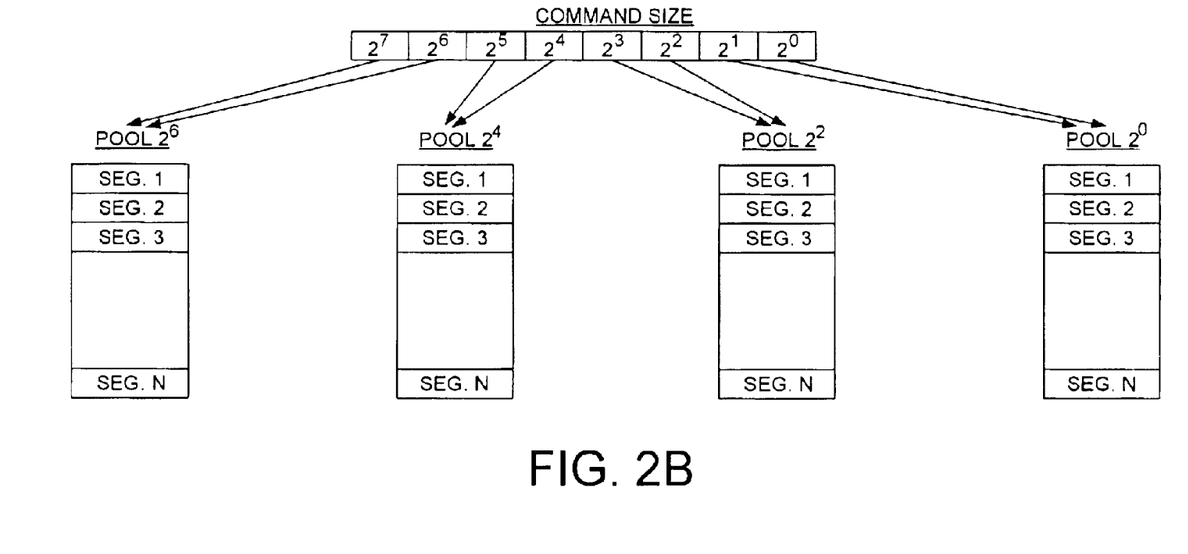

FIGS. 2A–2B show an alternative embodiment of the present invention wherein a plurality of bits in the command size are mapped to one of the segment pools. In this embodiment, the segment pools comprise cache segments having $2^0$, $2^2$, $2^4$ and $2^6$ blocks wherein two bits of the command size are mapped to each segment pool. For example, if the command size in binary is 11010111 blocks, the disk controller 12 allocates one cache segment from the $2^0$ segment pool for bit 0 of the command size, and two cache segments from the $2^0$ segment pool for bit 1 of the command size. Similarly, the disk controller 12 allocates one cache segment from the $2^6$ segment pool for bit 6 of the command size, and two cache segments from the $2^6$ segment pool for bit 7 of the command size. This embodiment reduces the complexity by reducing the number of segment pools maintained by the disk controller 12.

Figure 3:
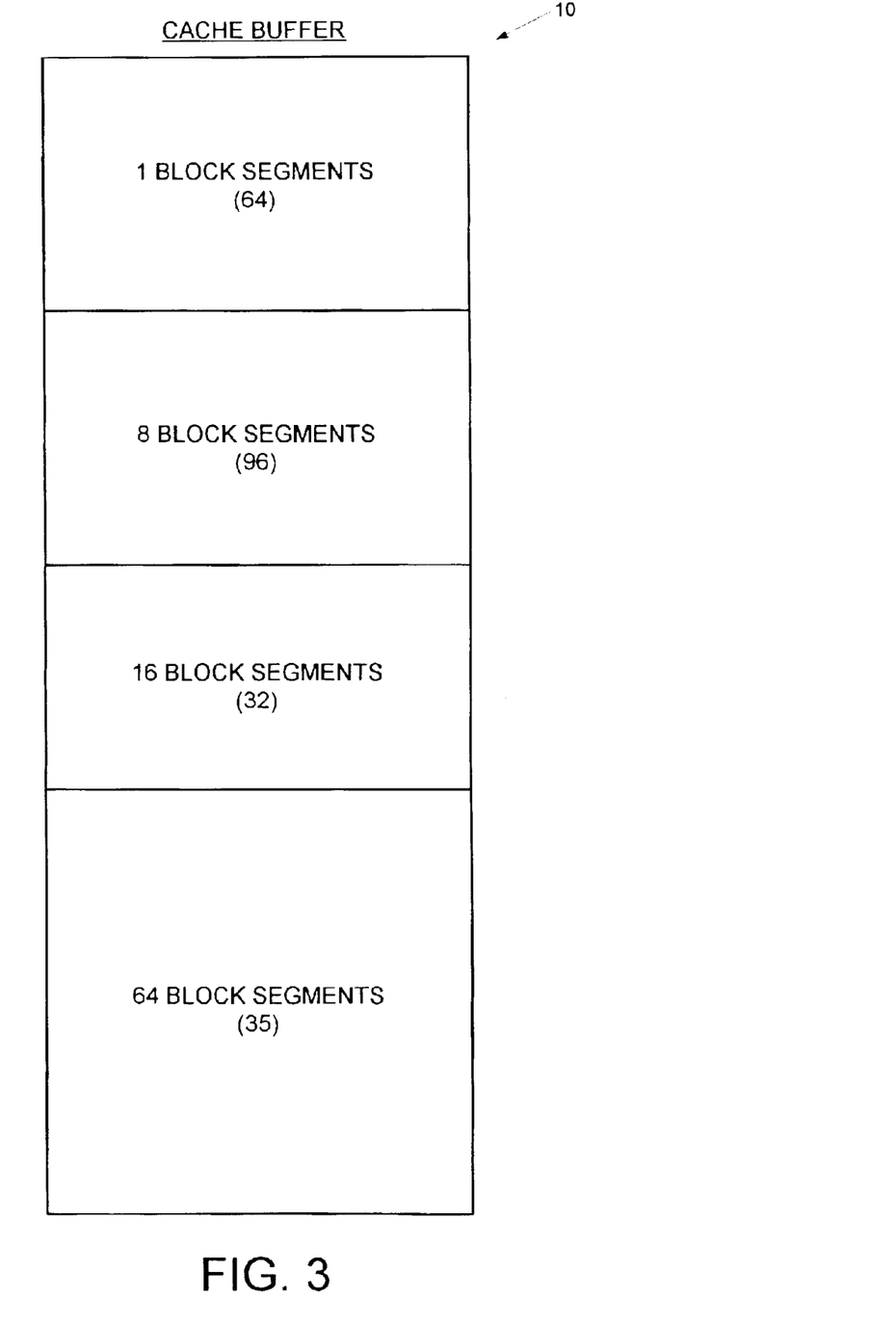
FIG. 3 shows an embodiment of the present invention wherein the cache buffer comprises a plurality of segment pools, each segment pool comprises a plurality of cache segments, and each cache segment comprises $2^k$ number of blocks where k is a predetermined value for each segment pool.

FIG. 3 shows an embodiment of the present invention wherein the cache buffer 10 comprises 64 one-block ($2^0$-block) cache segments, 96 eight-block ($2^3$-block) cache segments, 32 sixteen-block ($2^4$-block) cache segments, and 35 sixty-four-block ($2^6$-block) cache segments. Any suitable number of cache segments may be employed within each segment pool. In addition, any suitable number of segment pools having cache segments comprising a $2^k$ number of blocks may be employed.

Figure 4A:
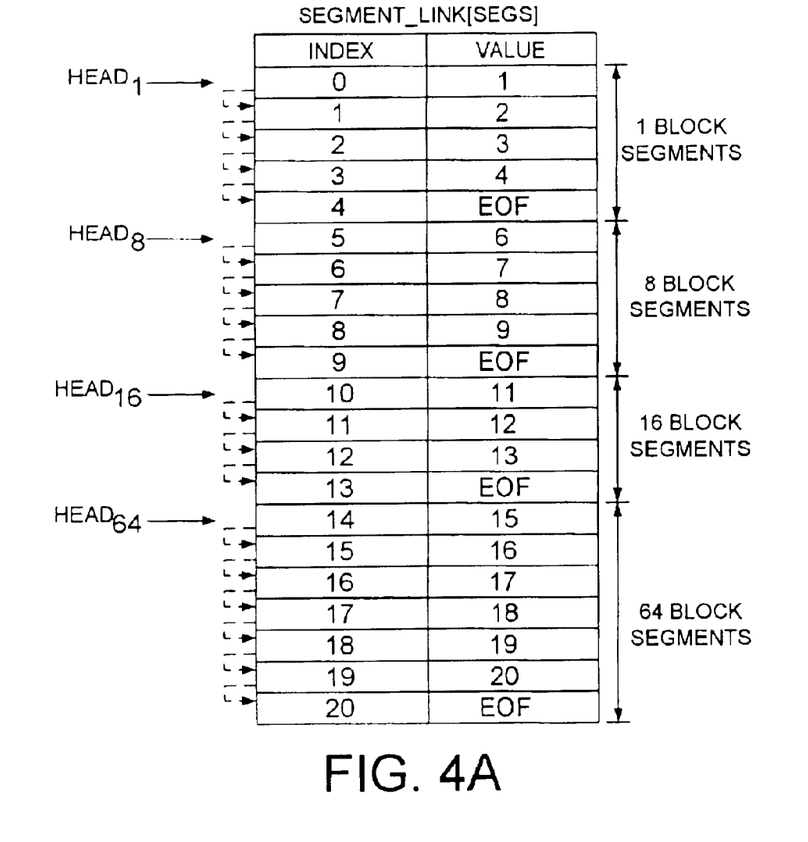
FIG. 4A show an embodiment of the present invention wherein a SEGMENT_LINK data structure maintains a linked list of cache segments for respective read and write commands.
Figure 4B:
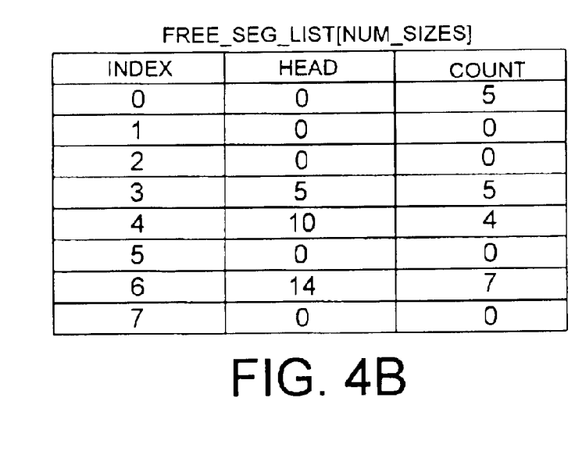
FIG. 4B shows an embodiment of the present invention wherein a FREE_SEG_LIST data structure maintains a head pointer and count for the free cache segments in each segment pool of FIG. 3.

FIG. 4A show an embodiment of the present invention wherein a SEGMENT_LINK data structure maintains a linked list of cache segments for respective read and write commands. The INDEX field identifies the segment number within the cache buffer 10, and the VALUE field points to the next cache segment within the link. The SEGMENT_LINK data structure is initialized so that the cache segments are linked together within each segment pool as illustrated in FIG. 4A. FIG. 4B shows a FREE_SEG_LIST data structure which maintains a HEAD pointer into each segment pool and COUNT field which identifies the number of free cache segments within each segment pool. The INDEX field of the FREE_SEG_LIST data structure corresponds to the segment pool size (i.e., $2^k$ number of blocks where k is the INDEX value). In this example, the cache buffer 10 comprises 5 one-block cache segments, 5 eight-block cache segments, 4 sixteen-block cache segments, and 7 sixty-four-block cache segments. The HEAD pointer is initialized to the first cache segment of each segment pool as illustrated in FIGS. 4A and 4B.

Figure 5A:
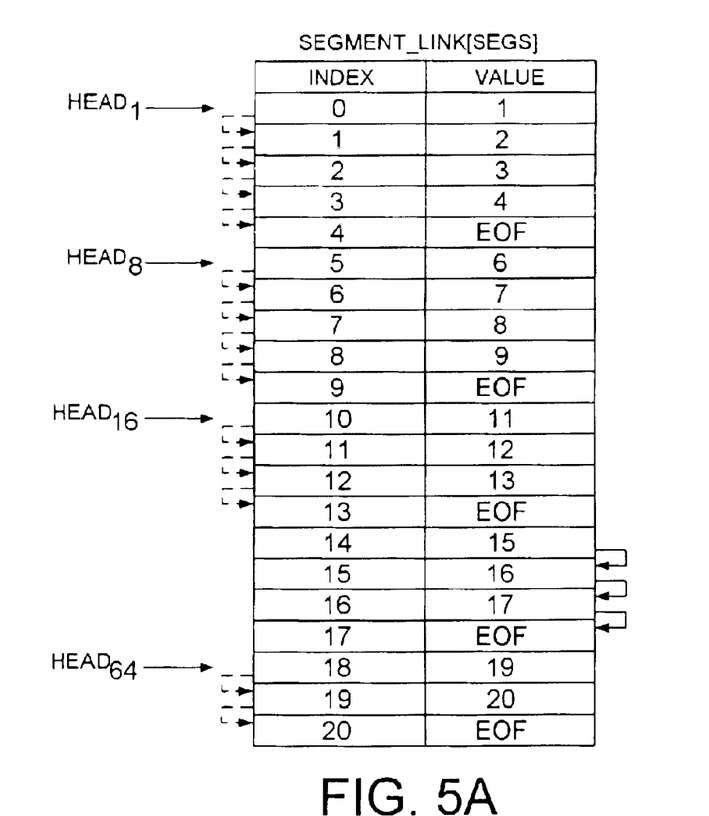
FIGS. 5A–5B illustrate how the SEGMENT_LINK and FREE_SEG_LIST data structures are updated after allocating four sixty-four-block cache segments for a read command.
Figure 5B:
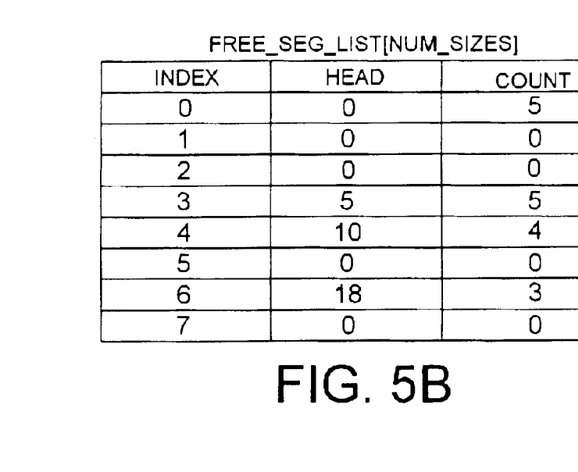

FIGS. 5A–5B illustrate how the SEGMENT_LINK and FREE_SEG_LIST data structures are updated after allocating 4 sixty-four-block cache segments for a read command. Each new cache segment is allocated from the $HEAD_{64}$ pointer, and the $HEAD_{64}$ pointer is re-assigned to point to the cache segment specified in the VALUE field. The VALUE field of the last cache segment allocated (17 in this example) is assigned EOF to identify it as the end of the link. As shown in FIG. 5B, after allocating the 4 sixty-four-block cache segments the $HEAD_{64}$ pointer (corresponding to INDEX 6 in the FREE_SEG_LIST) points to cache segment 19, and the COUNT field is decremented by 4.

Figure 6A:
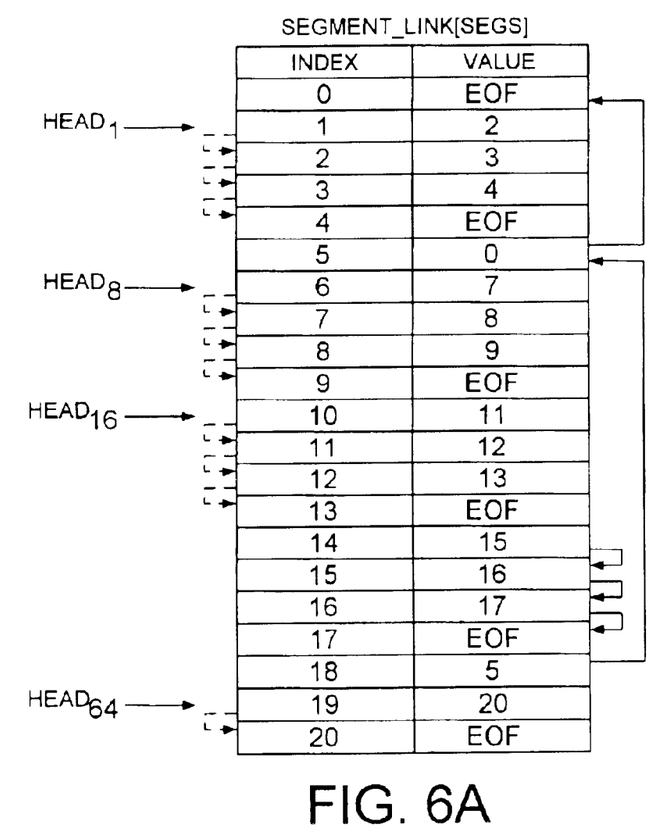
FIGS. 6A–6B illustrate how the SEGMENT_LINK and FREE_SEG_LIST data structures are updated after allocating one sixty-four-block cache segment, one eight-block cache segment, and one one-block cache segment for a write command.
Figure 6B:
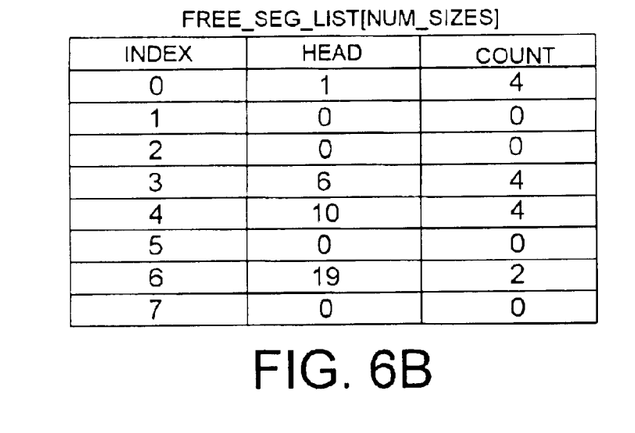

FIGS. 6A–6B illustrate how the SEGMENT_LINK and FREE_SEG_LIST data structures are updated after allocating 1 sixty-four-block cache segment, 1 eight-block cache segment, and 1 one-block cache segment for a write command. The sixty-four-block cache segment is allocated from the $HEAD_{64}$ pointer, and the $HEAD_{64}$ pointer is re-assigned to its VALUE field (i.e., to cache segment 19). The VALUE field for the cache segment 18 is assigned to the $HEAD_8$ pointer (i.e., cache segment 5), and the $HEAD_8$ pointer is re-assigned to its VALUE field (i.e., to cache segment 6). The VALUE field for the cache segment 5 is assigned to the $HEAD_8$ pointer (i.e., cache segment 0), and the $HEAD_1$ pointer is re-assigned to its VALUE field (i.e., to cache segment 1). The VALUE field for the cache segment 0 is assigned EOF since it identifies the end of the link. The COUNT fields in the 0, 3 and 6 entries of the FREE_SEG_LIST are decremented by one.

Figure 7A:
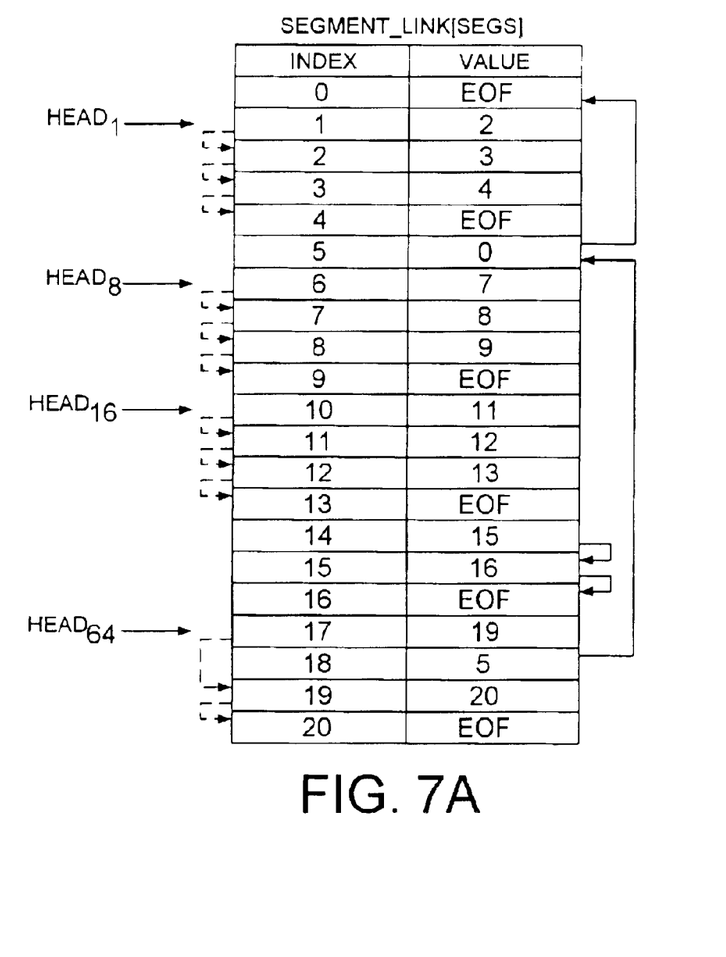
FIGS. 7A–7B illustrate how the SEGMENT_LINK and FREE_SEG_LIST data structures are updated after de-allocating one of the sixty-four-block cache segments for the read command of FIG. 5A.
Figure 7B:
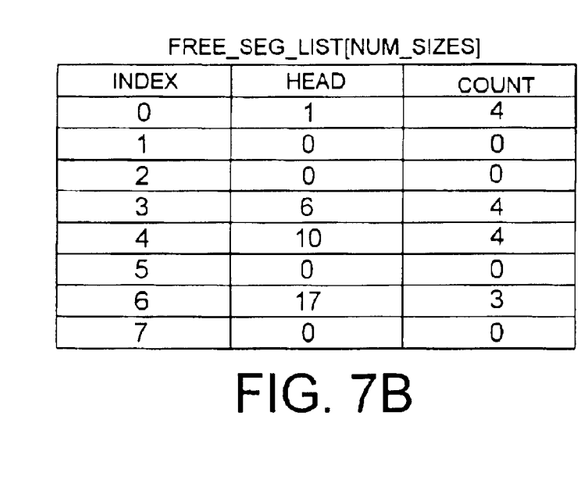

FIGS. 7A–7B illustrate how the SEGMENT_LINK and FREE_SEG_LIST data structures are updated after de-allocating 1 of the sixty-four-block cache segments for the read command of FIG. 5A. In this embodiment, the last cache segment of the link (cache segment 17) is deallocated first. The VALUE field of the de-allocated cache segment is assigned to the $HEAD_{64}$ pointer (i.e., to cache segment 19), and the $HEAD_{64}$ pointer is re-assigned to the de-allocated cache segment (i.e., to cache segment 17). The COUNT field in the 6 entry of the FREE_SEG_LIST is incremented by one.

Figures 8A, 8B:
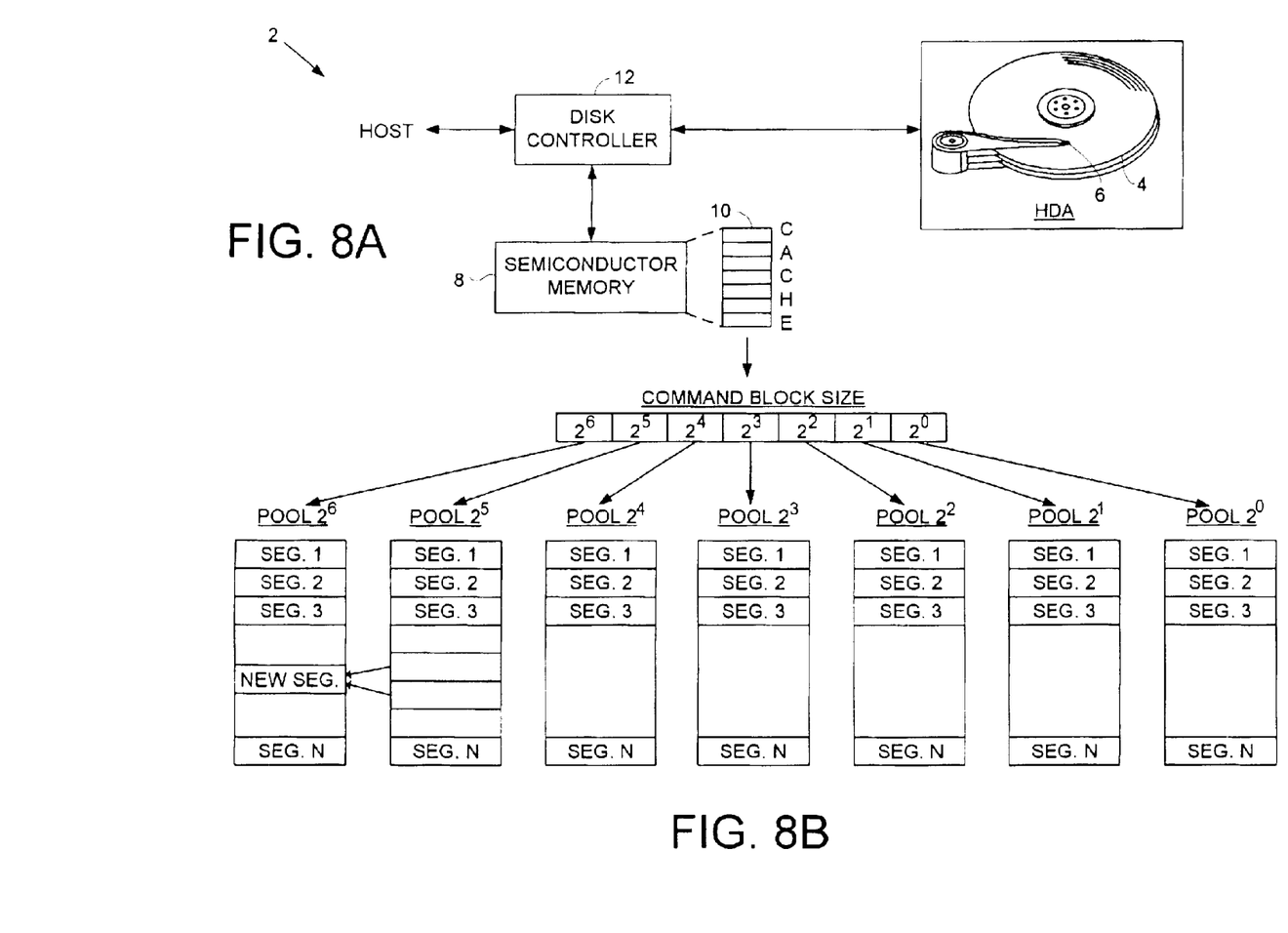
FIGS. 8A–8B show an embodiment of the present invention wherein two cache segments of a first segment pool are converted into a cache segment for a second segment pool.
Figure 9A:
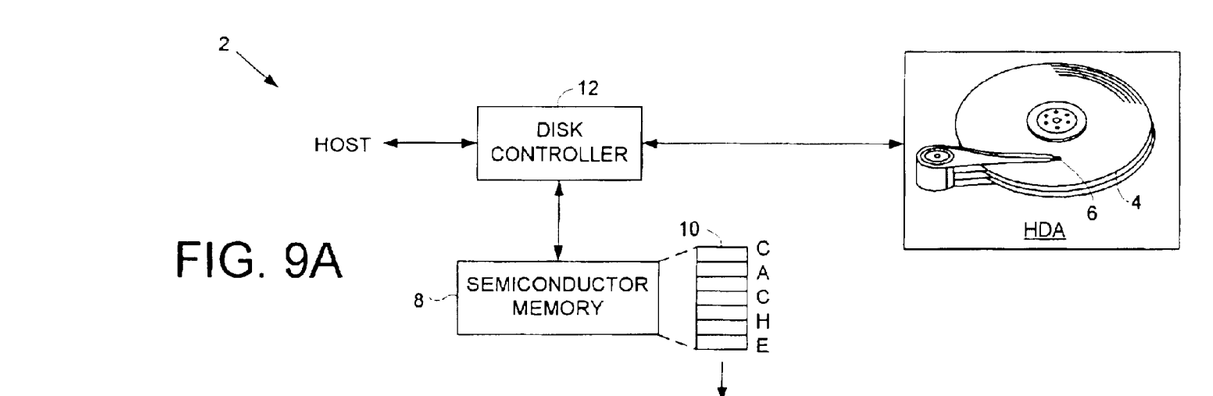
FIGS. 9A–9B show an embodiment of the present invention wherein a cache segment of a first segment pool is converted into two cache segments for a second segment pool.
Figure 9B:
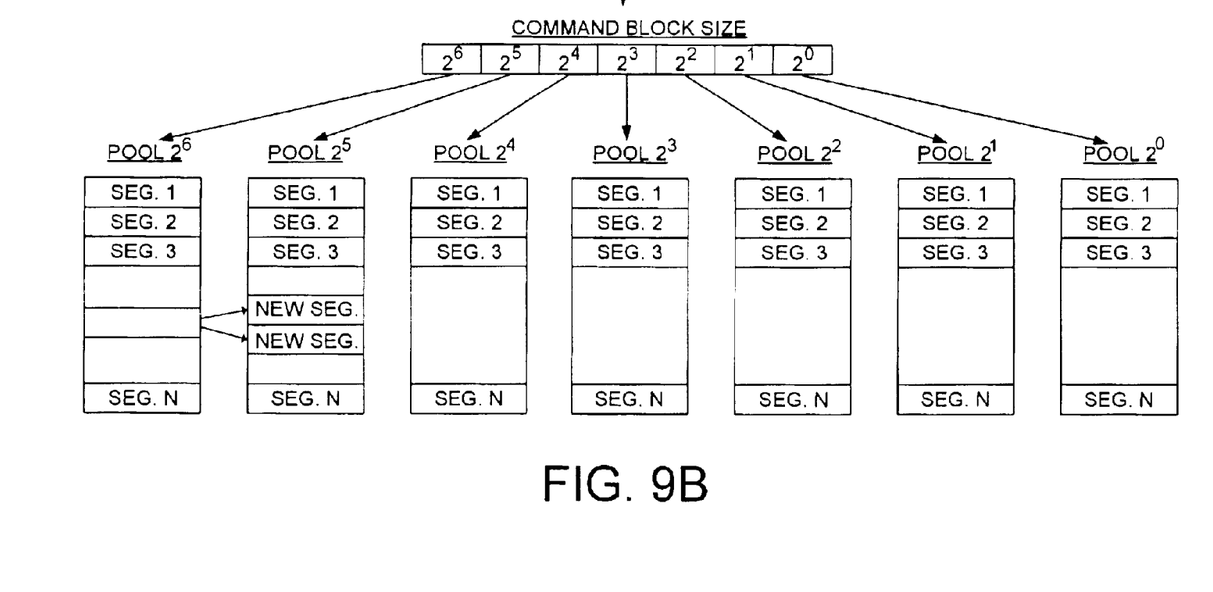

FIGS. 8A–8B illustrate a "pool conversion" embodiment of the present invention wherein two cache segments of a first segment pool are converted into a cache segment for a second segment pool. In the example shown in FIG. 8B, two cache segments from the $2^5$ segment pool are converted into a cache segment for the $2^6$ segment pool. FIGS. 9A–9B show an embodiment wherein a cache segment of a first segment pool (e.g., the $2^6$ segment pool) is converted into two cache segments for a second segment pool (e.g., the $2^5$ segment pool). In one embodiment, the pool conversion is performed when the number of free cache segments in a segment pool is zero (all cache segments allocated) or when the number of free cache segments falls below a predetermined threshold. The cache segments may be converted from any suitable segment pool other than an adjacent segment pool. For example, in one embodiment four cache segments from the $2^4$ segment pool are converted into a cache segment for the $2^6$ segment pool, or conversely, one cache segment from the $2^6$ segment pool is converted into four cache segments for the $2^4$ segment pool. In one embodiment, the disk controller 12 evaluates the number of free cache segments in each of the segment pools in order to select the most appropriate segment pool to perform the pool conversion.

I claim:

1. A disk drive comprising:
   (a) a disk comprising a plurality of tracks, each track comprising a plurality of blocks;
   (b) a head actuated radially over the disk;

(c) a semiconductor memory comprising a cache buffer for caching data written to the disk and data read from the disk, the cache buffer comprising a plurality of segment pools, each segment pool comprising a plurality of cache segments, and each cache segment comprises $2^k$ number of blocks where k is a predetermined integer for each segment pool; and (d) a disk controller for:

receiving a host command from a host computer, the host command comprising a command size comprising a plurality of bits indicating a number of blocks of data associated with the host command; and mapping each bit of the command size to a corresponding segment pool in order to allocate cache segments for the host command.

2. The disk drive as recited in claim 1, wherein a cache segment is allocated from a corresponding segment pool for each "1" bit in the command size.

3. The disk drive as recited in claim 1, wherein a plurality of the bits of the command size are mapped to one of the segment pools.

4. The disk drive as recited in claim 1, wherein the disk controller converts a plurality of cache segments of a first one of the segment pools to create a cache segment for a second one of the segment pools.

5. The disk drive as recited in claim 1, wherein the disk controller converts one of the cache segments of a first one of the segment pools into a plurality of cache segments for a second one of the segment pools.

6. A method of processing host commands in a disk drive, the disk drive comprising a disk comprising a plurality of tracks, each track comprising a plurality of blocks, a head actuated radially over the disk, and a semiconductor memory comprising a cache buffer for caching data written to the disk and data read from the disk, the cache buffer comprising a plurality of segment pools, each segment pool comprising a plurality of cache segments, and each cache segment comprises $2^k$ number of blocks where k is a predetermined integer for each segment pool, the method comprising the steps of:

(a) receiving a host command from a host computer, the host command comprising a command size comprising a plurality of bits indicating a number of blocks of data associated with the host command; and (b) mapping each bit of the command size to a corresponding segment pool in order to allocate cache segments for the host command.

7. The method as recited in claim 6, wherein a cache segment is allocated from a corresponding segment pool for each "1" bit in the command size.

8. The method as recited in claim 6, wherein a plurality of the bits of the command size are mapped to one of the segment pools.

9. The method as recited in claim 6, wherein the disk controller converts a plurality of cache segments of a first one of the segment pools into a cache segment for a second one of the segment pools.

10. The method as recited in claim 6, wherein the disk controller converts one of the cache segments of a first one of the segment pools into a plurality of cache segments for a second one of the segment pools.

* * * * *